March 30, 1943.  A. F. MISCH  2,315,006

METHOD OF MAKING BEARING CAPS

Filed Nov. 10, 1941

INVENTOR.
ALBERT F. MISCH
BY Hull & West,
ATTORNEYS.

Patented Mar. 30, 1943

2,315,006

UNITED STATES PATENT OFFICE 2,315,006

METHOD OF MAKING BEARING CAPS

Albert F. Misch, Cleveland, Ohio, assignor to The Almetal Universal Joint Company, Cleveland, Ohio, a corporation of Ohio Application November 10, 1941, Serial No. 418,496

1 Claim. (Cl. 29—149.5)

This invention relates to the method of making bearing caps, and more particularly to the method of making the type of caps which have been employed in connection with the trunnions of universal joints.

Bearing caps of the type referred to comprise each a cup-shaped shell and a flanged base and have been made from a single drop forging. However, this mode of manufacturing these caps has required considerable machining to be done, in order to give proper shape to the shell portions of the said caps, and this machining has involved a substantial consumption of time and labor.

It is the general purpose and object of my invention to manufacture a cap of the type referred to in such manner as to reduce the time and labor involved in the production of the same, thereby to enable the production of a greater number of the caps within a given period of time. A further object of the invention is to produce a cap which, while not consisting of a single or integral piece, will possess all of the necessary rigidity and other advantages attainable by constructing the same in accordance with this prior practice.

Figure 1:
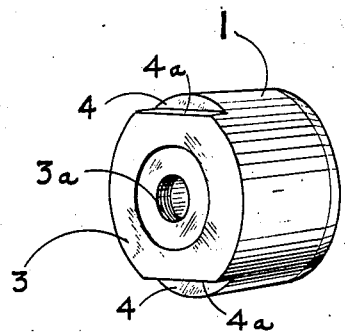
Figure 2:
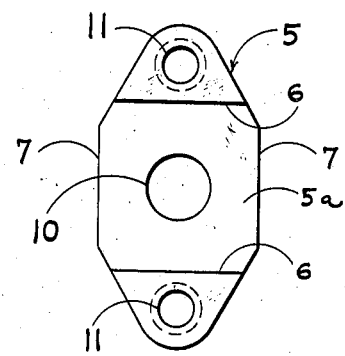
Figure 5:
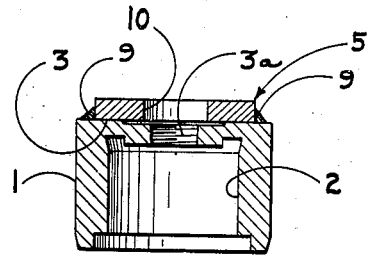
Figure 4:
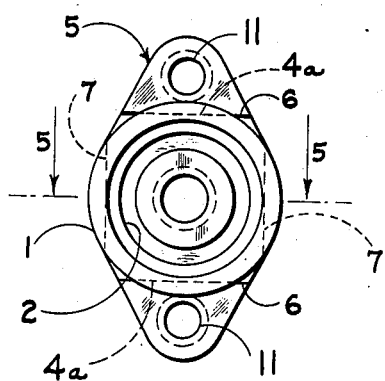
Figure 3:
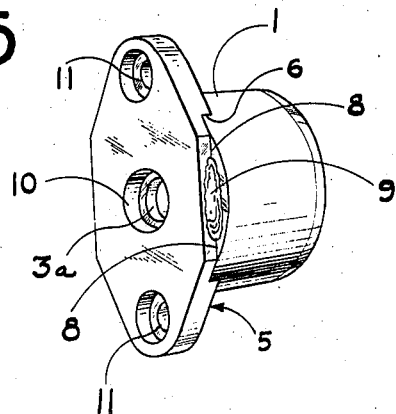

I accomplish the foregoing objects in and through the construction and arrangement of parts shown in the accompanying drawing, wherein Fig. 1 represents a perspective view of the shell member of my bearing cap prior to its assembly with the flanged base member; Fig. 2 a plan view of the flanged base member employed with the said shell member; Fig. 3 a perspective view of the complete bearing cap, with the flanged member presented toward the observer; Fig. 4 a plan view of said complete bearing cap; and Fig. 5 a detail in section taken on the line 5—5 of Fig. 4.

Describing by reference characters the various parts shown herein, I denotes the cylindrical outer surface of the shell member of my cap, the said member having also a cylindrical bore, the wall of which is indicated at 2 and which bore extends from the inner end of the shell toward but terminates short of, the outer end of the shell, thereby to provide an end wall 3, said end wall having a central aperture 3ª for lubricant, the said shell member being produced by an automatic screw machine operation from bar stock of suitable outside diameter. The outer end of the said shell member is milled off, as shown at 4, to provide walls 4ª which are parallel to each other and to the axis of the bore defined by the wall 2 thereby to enable this end to fit into a wide slot or cross channel 5ª provided in the flanged base member 5, said slot or channel being of less width than the outside diameter of the outer end of the shell and being defined by and between parallel walls 6, with which the parallel walls 4ª of the shell member are adapted to form a pressed fit.

In practice, the flanged base member may be made from a stamping. It will be noted that its length between the parallel side walls 7 is less than the outside diameter of the shell member, its length between the side walls being so proportioned to the outside diameter of the shell member as to provide an angular recess 8 between each side wall and the overhanging outer end portion of the shell member, which recess is of sufficient extent to enable an amount of welding material to be applied to the joint between the shell member and the flange member to insure a rigidity of connection between these members which, for all practical purposes, is equal to that obtained by making these members from a one-piece forging.

The shell member having been press-fitted upon the flanged base member, the said parts are then united by welding the same together at and within the said angular recesses, the welding being indicated at 9. The welding is preferably accomplished by an arc-welding operation wherein a metallic welding rod is employed.

It will be noted that the flanged member 5 is provided with a circular opening 10, the center of which is located midway between the ends and the sides of the said member. This enables the shell member and the flanged member, when assembled in the manner described hereinbefore, to be mounted upon a support whereby the openings 11 for the anchoring screws may be accurately located with respect to the center.

By making the bearing in the manner described, I am enabled to effect a substantial reduction in the machining operations required in the production of other bearing caps of this type with which I am familiar; to effect a substantial saving in time required for the production of such bearing caps; and to provide bearing caps having, for all practical purposes, all of the rigidity and efficiency of a bearing cap made from a one-piece forging.

Having thus described my invention, what I claim is:

The method of making an end cap bearing comprising the following steps: cutting, in a bar stock shell blank, a cylindrical bore extending from one end thereof toward but not through the opposite end whereby said opposite end will constitute an integral cap for the shell; milling opposite sides of the shell thus produced thereby to provide each side with an angular slot having a wall extending from the closed end of said shell parallel with the bore thereof and with a wall extending at right angles outwardly from the former wall through the exterior surface of the shell, thereby to provide opposite sides of the closed end of the said shell with angular seating portions having parallel walls; forming a base-flange blank of greater length but less width than the outside diameter of said shell; forming in one of the two extended surfaces of said base flange blank a slot extending entirely thereacross, the said slot being defined between parallel walls extending from the bottom of the slot at right angles with respect to the body of the base flange blank, the distance between the walls of the slot being substantially equal to the distance between the parallel walls formed in the seating portions of the base of the shell and being of the same depth as the latter parallel walls; pressing the shell and the base flange thus produced into engagement with each other with the parallel walls of the seating portions of the shell engaging and forming seats with the parallel walls of the slot and with the portions of the closed end of the shell intermediate of the slotted portions thereof projecting beyond the ends of the slot; and uniting by a welding operation the portions of the shell member which overhang the ends of the slot of the base flange and the portions of the base flange overhung thereby.

ALBERT F. MISCH.